United States Patent
Heitmann

[11] Patent Number: 6,067,396
[45] Date of Patent: May 23, 2000

[54] PHYSICAL-CONTACT OPTICAL FIBER CONNECTOR

[75] Inventor: Walter Heitmann, Gross-Bieberau, Germany

[73] Assignee: Deutsche Telekom AG, Bonn, Germany

[21] Appl. No.: 09/044,813

[22] Filed: Mar. 20, 1998

[30] Foreign Application Priority Data

Mar. 27, 1997 [DE] Germany .......................... 197 12 950

[51] Int. Cl.⁷ .................................................. G02B 6/00
[52] U.S. Cl. .............................. 385/139; 385/51; 385/76; 385/77; 385/78
[58] Field of Search ................................... 385/31, 33, 38, 385/51, 76, 77, 78, 85, 139, 138

[56] References Cited

U.S. PATENT DOCUMENTS

| | | | |
|---|---|---|---|
| 4,383,732 | 5/1983 | Dalgoutte et al. | 385/78 X |
| 4,398,796 | 8/1983 | Dalgoutte et al. | 385/78 X |
| 5,113,476 | 5/1992 | Okada et al. | 385/140 |
| 5,263,103 | 11/1993 | Kosinski | 385/31 |
| 5,522,006 | 5/1996 | Takeuchi et al. | 385/139 |
| 5,737,471 | 4/1998 | Sugiyama et al. | 385/123 |
| 5,790,762 | 8/1998 | Aepli et al. | 385/80 |
| 5,809,198 | 9/1998 | Weber et al. | 385/139 |

OTHER PUBLICATIONS

Shintaku, T. et al., "Highly Stable Physical–Contact Optical Fiber Connectors with Spherical Convex Ends," Journal of Lightwave Technology, vol. 11, No. 2, Feb. 1993, pp. 241–248.
Brochure of the Swiss company Diamond Lichtwellenleiter–Komponenten (Optical Fiber Components) 002–037–104P007 (1995).
Dr. W. Heitmann, "Dämpfungsmessungen an der optischen Kabelstrecke München—Passau—Schärding (Österreich), Feb. 15, 1996."
Dr. Hartmut Gruhl, "Dämpfunsmessungen an der Telekom–LWL–Trasse München—Passau—Schärding/Projekt Phoron, Bitest bed, Nov. 27, 1996".
Dr. Harmut Gruhl, "Experimentierschleife vom Labor 801 Gebäude 53 TZ über, Rödermark 10, Dec. 30, 1996."
Kohlrausch, F., "Praktische Physik," (Practical Physics), Teubner Verlag Stuttgart, 22$^{nd}$ edition (1968)23.
Kaiser, N., "Interference coatings for the ultraviolet spectral region Dünne Schichten für den ultravioletten Spektralbereich," Laser–Optik, pp. 52–56.
Richter, F., "Superharte dünne Schichten," Phys. Bl. 52 (1996), Nr. 4, pp. 355–358.

(List continued on next page.)

Primary Examiner—Brian Healy
Attorney, Agent, or Firm—Kenyon & Kenyon

[57] ABSTRACT

An physical-contact optical fiber connector for optical fibers has improved long-term stability. The fiber surface ends of the optical fibers are coated with a thin, absorption-free film made of very hard material, whereby the resistance to scoring is considerably increased. The thickness of the protective film is such that interfering reflection losses due to differences in the refraction indices are largely avoided. The hardness of the film is greater than that of the optical fiber material. Its optical thickness is also small compared to the operating wavelength. For optical fibers made of quartz glass, a protective film of $Al_2O_3$ is used. Other oxides, nitrides borides, and carbides are also used. For optical fibers made of multicomponent glass or plastic, the protective film is made of an absorption-free material of greater hardness. The optical thickness of the protective film is between $1/1000$ and $1/10$ of the operating wavelength. The films are applied using ion-supported processes or ion-beam sputtering or the MicroPlasma process. Due to the small diameter of the rods, a large number can be placed into the coating system and coated at the same time. Thus physical-contact optical fiber connectors are obtained that have virtually unlimited service life and have extremely small insertion losses or connection losses.

12 Claims, 1 Drawing Sheet

OTHER PUBLICATIONS

Taga, Y., "Recent progress of optical thin films in the automobile industry," Applied Optics, vol. 32, Mp/28 (Oct. 1, 1993), pp. 5519–5530.

Henking, R. et al., "Ion–Beam–Sputtering: A Deposition Process for laser Components of the Future," Laser und Optoelektronik, vol. 28(2) 1996, pp. 43–49.

Sampson, D., "ThK Fiber Components," OFC '96 Technical Digest, pp. 242–243.

Laser–Optik, Laser und Optoelektronik, vol. 28(2) 1996, pp. 57–60.

PHYSICAL-CONTACT OPTICAL FIBER CONNECTOR

FIELD OF THE INVENTION

The present invention relates to a physical-contact optical fiber connector.

RELATED TECHNOLOGY

Physical-contact optical fiber connectors are known and are widely used in communication technology. Known plugs with one optical fiber, two optical fibers, for example for home wiring or computer wiring, or with four to twenty-four optical fibers are used not only for data and information transmission, but also for video and speech transmission. Physical-contact optical fiber connectors are designed on the following principle: The optical fiber with a typical outside diameter of 125 μm is secured in the center of a hard metal or ceramic rod having a diameter of 2.5 mm or 1.25 mm. The end face of the optical fiber, polished to a spherical cap, projects somewhat forward at the end face of the rod. The rods are mounted together using a cylindrical sleeve, so that the offset of the fiber cores is less than 1 μm. The fibers are inserted with a slight amount of pressure, which causes the spherical caps to flatten in the center. Clean end surfaces result in optical contact with low insertion loss and very small back-reflection. In T. Shinta et al. "Highly Stable Physical-Contact Optical Fiber Connectors with Special Convex Ends," Journal of Lightwave Technology 11, 2 (1993) 241, which is hereby incorporated by reference herein, there is a detailed description of the principles and manufacturing of physical-contact connectors.

Typical data and embodiments of physical-contact optical fiber connectors for an optical fiber are described and compiled in the brochure of the Swiss company Diamond "Lichtwellenleiter-Komponenten (Optical Fiber Components) 002-037-104P007(1995)." According to this publication, insertion losses of new and clean physical-contact connectors is 0.2 dB to 0.4 dB for single-mode fibers. Service life is given as 1000 connection cycles, i.e., the insertion loss should not increase by more than 0.2 dB after 1000 insertions under clean surface and ambient conditions. In practice, however, much higher insertion loss values are obtained with known physical-contact optical fiber connectors. In loss measurements in the DTAG operating network, insertion losses between 0.3 dB and 0.9 dB were found, as can be seen in the following publications: W. Heitmann and H. Gruhl: "Dämpfungsmessungen an der optischen Kabelstrecke München-Passau-Schärding (Österreich), 15.02.1996" (Loss measurements on the Munich-Passau-Schärding (Austria) optical fiber line, Feb. 15, 1996), H. Gruhl: "Dämpftmgsmessungen an der Telekom-LWL Trasse München-Passau-Schärding/Projekt Photon, Bitest bed, 27.11.1996" (Loss measurements on the Munich-Passau-Schärding Telekom-LWL route / Photon Project, Bitest bed, Nov. 27, 1996), and H. Gruhl: "Experimentierschleife vom Labor 801 Gebäude 53 TZ über R ödermark 10, 30.12.1996" (Experimental loop from Lab 801 Building 53 TZ via Rödermark 10, Dec. 30, 1996), with values up to 4 dB having been measured in the Austrian Telekom network.

Insertion losses of physical-contact optical fiber connectors are mostly due to contamination of and damage to the contact area between the fiber end surfaces, causing high insertion losses. The measurement results of the systems according to the above three publications refer to standard single-mode optical fibers, a fiber type used almost exclusively in telecommunication company networks. The mode field diameter, i.e., the diameter in which the predominant part of the optical power is conducted in the optical fiber, and thus also in the contact surface, is approximately 10 μm.

Slight contamination of the contact surface can considerably increase the insertion loss. Whereas films of contaminants can be removed by cleaning the end surfaces, this is not possible for surfaces that are scored. Scored surfaces are caused by dust particles that get onto the contact surface during insertion in a dusty environment and damage the surfaces when the spherical caps are pressed together. Such damages have been relatively infrequent, since the operating networks are serviced by trained personnel and reconnections are relatively infrequent. In local networks, building systems and computer networks a high number of connections are needed on relatively short segments, which must also be frequently reconnected. In addition, reconnection is often performed by untrained personnel, so that in the case of ten physical-contact connections, for example, additional losses and interruption in the connection may easily result.

SUMMARY OF THE INVENTION

An object of the present invention is therefore to increase the long-term stability of physical-contact optical fiber connectors, avoid high insertion losses, and make repeated reconnections possible even by untrained personnel without negative consequences.

The present invention therefore provides a physical-contact optical fiber connector for optical fibers with end face contacts, characterized in that the end faces of the optical fiber are provided with a thin, absorption-free protective film with a hardness that is greater than that of the optical fiber material and whose optical thickness is small compared to the operating wavelength.

Additional advantageous embodiments of the present invention include that:

a) the optical fibers are made of quartz glass and the protective film is made of corundum ($Al_2O_3$);

b) the optical fibers are made of quartz glass and the protective film is made of oxides, nitrides, borides, or carbides;

c) the optical fibers are made of multicomponent glasses or plastic and the protective film is made of a harder absorption-free organic or inorganic material.

d) the optical thickness of the protective film is between $1/1000$ and $1/10$ of the operating wavelength;

e) the fiber surfaces of an optical fiber are coated with a thin, absorption-free protective film made of very hard material the thickness of the protective film being suitably small to avoid interfering reflection losses due to differences in the refraction indices;

f) the protective film of the optical fiber is made of oxides such as $Y_2O_3$, $Sc_2O_3$, $ZrO_2$, and $HfO_2$; and g) ion-supported processes or ion-beam sputtering or the MicroPlasma process are used for producing the protective film.

The resistance to scoring of the optical fiber is considerably increased by coating the optical fiber surfaces with a thin, absorption-free film made of a very hard material. The thickness of the protective film is so small that interfering reflection losses due to refraction index differences are largely avoided. The thickness of the protective film is selected to be so small that interfering reflection losses due to differences in the refraction indices are largely avoided.

The book by F. Kohlrausch: "Praktische Physik"(Practical Physics), Teubner Verlag Stuttgart, $22^{nd}$ edition (1968) 23, discloses that, for example, $Al_2O_3$ (corundum) has a Knoop hardness of 1800, so that a quartz glass sand grain cannot score a surface made of this material. Since the film coating is very thin, light is virtually unaffected by it, so that reflections of the boundary surfaces remain almost unchanged. The protective films can be produced and applied using ion-supported processes, ion-beam sputtering, or a MicroPlasma process. The optical fiber can be built into the plug rod in advance and the spherical caps at the end surfaces can be polished. Due to the small diameter of the rods, a large number can be placed and coated in the coating system simultaneously. The coating time is relatively short due to the small thickness of the protective film. Opposite fiber ends can then be spliced to the optical fiber.

BRIEF DESCRIPTION OF THE DRAWING

The present invention is now explained with reference to an embodiment as shown in.

DETAILED DESCRIPTION

Figure 1:
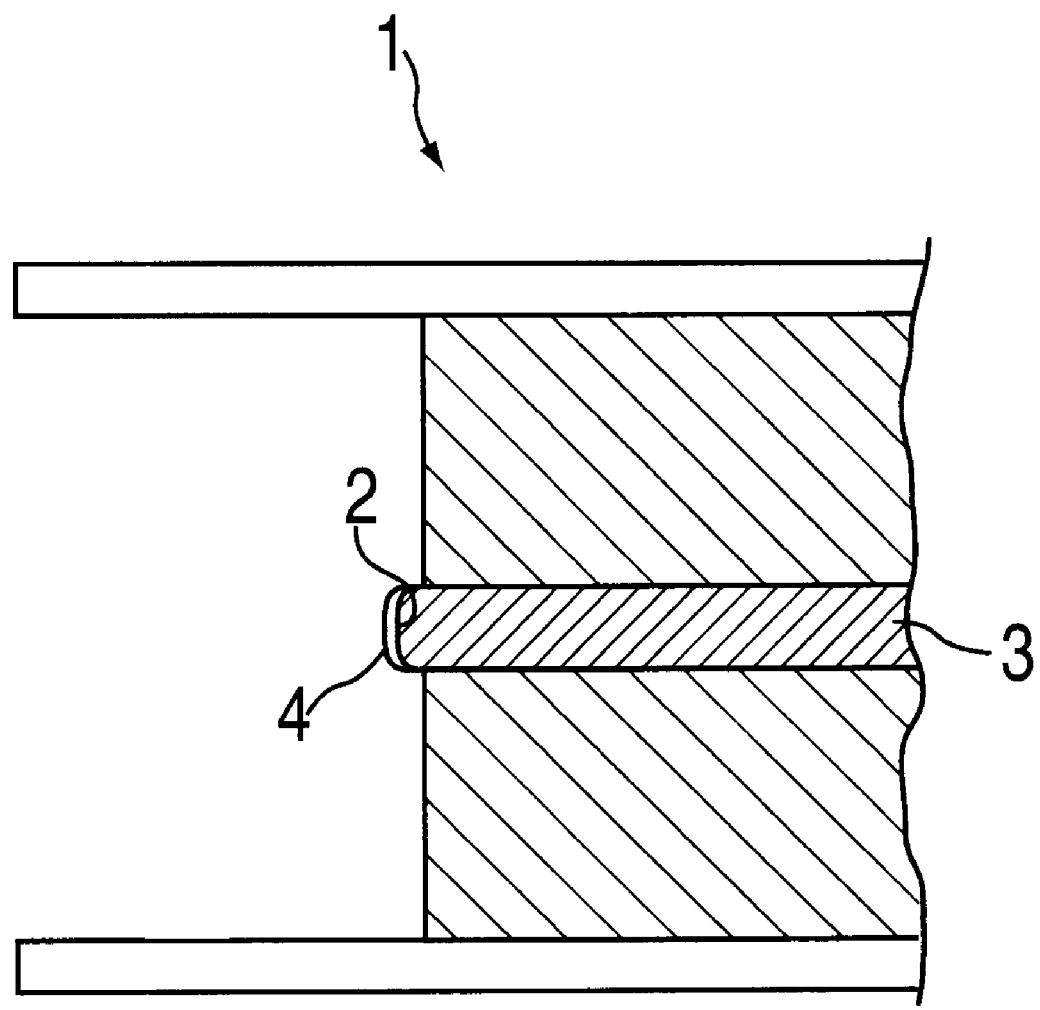
FIG. 1, which shows schematically a side view of part of a connector according to the present invention, although not to scale for purposes of clarity.

FIG. 1 shows a connector 1 in which an end surface 2 of an optical fiber 3 is coated with a thin, absorption-tree film 4 made of a very hard material, whereby the scoring resistance is substantially increased. It should be understood that a plurality of optical fibers 3 may be provided. The thickness of the protective film 4 is such that interfering reflection losses due to differences in the refraction indices are largely avoided. The decisive factor for the resistance of a material to surface damage is its hardness. Optical fibers are usually made of quartz glass, which is a relatively stable glass, but its hardness is exceeded by many materials, so that it becomes scored over time when used in physical-contact optical connectors. In a study reported in the publication by Y. Taga: "Recent progress of optical thin films in the automobile industry," Applied Optics 32, 28 (1993) 5519, dealing with the stability of coated automobile windshield surfaces, it was determined that $Al_2O_3$ films with a thickness of 8 nm are sufficient to considerably increase the scoring resistance of glass surfaces. The Knoop hardness of quartz glass is given as 820, while the value for $Al_2O_3$ (corundum) is 1800, according to F. Kohlrausch "Praktische Physik," Teubner Verlag Stuttgart, 22th edition (1968)23. According to this publication, a quartz glass sand grain will not score an $Al_2O_3$ film applied to a glass surface. The optical thickness of the protective layer, i.e., the refraction index n multiplied by the geometric thickness d of the film, must be small compared to ¼ of the wavelength $\lambda$ used for the transmission. Reflection attains a maximum at an optical thickness of $\lambda/4$ if the refraction index of the protective film is greater than that of the quartz glass. The refraction indices of quartz glass and $Al_2O_3$ are approximately 1.45 and 1.7, respectively. Thus an 8-nm geometric thickness of $Al_2O_3$ corresponds to an optical thickness of approximately 14 nm. The operating wavelengths of optical communication systems typically are 1300 nm and greater. This results in an optical thickness of at least 325 nm for a $\lambda/4$ film. For an optical protective film with a thickness of 14 nm, or when the optical thicknesses of the end faces add up to 28 nm upon contact, such an arrangement is still less than 10% of the optical thickness of the $\lambda/4$ film. Light is practically unaffected by such a thin layer, so that the reflection of the boundary layer remains unchanged. A small increase of about 0.3 dB in reflection would still be in the admissible range if it helped achieve long-term stability of the contact surfaces, as is the case here. The back-reflection occurring then can be reduced to sufficiently small values by slightly angling the spherical caps. In addition to $Al_2O_3$, all absorption-free materials with even greater hardnesses may be considered as materials for the protective layer to be applied. Suitable oxides include $Y_2O_3$, $Sc_2O_3$, $ZrO_2$, and $HfO_2$, as set forth in the publication by N. Kaiser "Dünne Schichten für den ultravioletten Spektralbereich (Thin films for the ultraviolet spectral range)," Laser und Optoelektronik 28, 2 (1996) 52. In the publication by F. Richter: "Superharte dünne Schichten (Superhard thin films)", Physikalische Blätter 52, 4 (1996) 355, a number of substances are listed, such as nitrides, borides, and carbides, having hardnesses between that of $Al_2O_3$ and diamond.

Among other methods, ion-supported processes, such as described in the two last-mentioned publications, ion-beam sputtering, such as described in the publication by R. Henking et al.: "Ionenstrahl-Zerstäuben: Ein Beschichtungsverfahren für Laserkomponenten der Zukunft (Ion-beam sputtering: a coating process for laser components of the future)," Laser und Optoelektronik 28, 2 (1996) 43, or the MicroPlasma process according to the publication by M. A. Scobey et al.: "Passive DWDM components using Micro-Plasma optical interference filters," Optical Fiber Conference OFC 1996, Thk 1242, can be used. It is recommended that the optical fiber be built into the connector rod in advance and the spherical caps be polished at the end faces. Due to the small diameter (2.5 mm or 1.25 mm) of the rods, a large number can be placed and coated in the coating system at the same time. The required coating time is relatively short due to the small thickness of the protective layer. The opposite ends of the fibers can then be spliced to the optical fiber lead. A typical value for the splice loss is currently 0.05 dB.

What is claimed is:

1. A physical-contact optical fiber connector for use in an optical fiber network having an operating wavelength comprising:
   at least one optical fiber having an end face and an optical fiber hardness; and
   a thin, absorption-free protective film at the end face, the protective film having a hardness greater than the optical fiber hardness and having an optical thickness small compared to the operating wavelength.

2. The physical-contact optical fiber connector as recited in claim 1 wherein the at least one optical fiber is made of quartz glass and the protective film is made of corundum.

3. The physical-contact optical fiber connector as recited in claim 1 wherein the at least one optical fiber is made of quartz glass and the protective film is made of at least one of oxides, nitrides, borides, and carbides.

4. The physical-contact optical fiber connector as recited in claim 1 wherein the at least one optical fiber is made of multicomponent glasses or plastic and the protective film is made of a harder absorption-free material.

5. The physical-contact optical fiber connector as recited in claim 1 wherein the optical thickness of the protective film is between 1/1000 and 1/10 of the operating wavelength.

6. The physical-contact optical fiber connector as recited in claim 1 wherein the fiber protective film is made of a very hard material and coats fiber surfaces of the at least one optical fiber, a physical thickness of the fiber protective film being suitably small to avoid interfering reflection losses due to differences in refraction indices.

7. The physical-contact optical fiber connector as recited in claim 6 wherein the protective film is made of oxides.

8. The physical-contact optical fiber connector as recited in claim 7 wherein the protective film is made of at least one of $Y_2O_3$, $Sc_2O_3$, $ZrO_2$, and $HfO_2$.

9. The physical-contact optical fiber connector as recited in claim 1 wherein the protective film is deposited by at least one of an ion-supported process, ion-beam sputtering, and a MicroPlasma process.

10. The physical-contact optical fiber connector as recited in claim 1 wherein the protective film is made of oxides.

11. The physical-contact optical fiber connector as recited in claim 10 wherein the protective film is made of at least one of $Y_2O_3$, $Sc_2O_3$, $ZrO_2$, and $HfO_2$.

12. The physical-contact optical fiber connector as recited in claim 6 wherein the at least one optical fiber includes a plurality of optical fibers.

* * * * *